Aug. 18, 1953   L. E. MARTIENSSEN   2,649,081
CHARGE FORMING DEVICE
Filed Aug. 1, 1949

Inventor
Laurence Ernest Martienssen
By Wenderoth, Lind & Ponack
attorneys

Patented Aug. 18, 1953

2,649,081

UNITED STATES PATENT OFFICE 2,649,081

CHARGE FORMING DEVICE

Laurence Ernest Martienssen, Parkview, Johannesburg, Transvaal, Union of South Africa Application August 1, 1949, Serial No. 108,004
In the Union of South Africa August 5, 1948

17 Claims. (Cl. 123—25)

The present invention relates to improvements in the operation of internal combustion engines and in apparatus therefor.

An object of the invention is the provision of improved means for economising on the outlay for the motor fuels employed.

Other objects of the invention are indicated further on in this specification.

It is already known that the introduction of water into the fuel-air mixture to be fed to the cylinders of an internal combustion engine causes a slowing down of the flame propagation rate in the mixture, preventing detonation and pre-ignition which leads to knocking if low-octane fuels are used. The introduction of water allows the efficient use of higher compression ratios and enables weaker mixtures to be ignited sooner, giving a higher M. E. P. and cooler exhaust gases. It also causes an increase in power output for a given quantity of fuel or an unchanged output for a lower fuel consumption.

It has also been proposed to economise on the outlay for fuel by injecting a low-octane fuel into a carburettor connected with a supply of fuel of better octane number, for example, ordinary or higher grade gasoline.

I have now found that the introduction to the engine of a substance reducing fuel costs and/or inhibiting knocking can be carried out with particular advantage with the aid of a pressure head of exhaust gas from the engine.

In a preferred form of my invention I introduce water into the fuel-air mixture to be fed to the cylinders of an internal combustion engine by injecting the water into the air supply from a gas-tight water tank by means of a pressure head of exhaust gas from the engine.

In the process and apparatus in accordance with the present invention the water may be injected into the air stream at any place before it reaches the fuel jets in the carburettor.

I have found that it is also of advantage to inject, with the aid of a pressure head of exhaust gas from the engine, low-octane fuel from an air-tight container for said fuel into the carburettor connected with a source of fuel or better octane number, for example, ordinary or higher grade gasoline.

One of the advantages of the present invention is that the proportion of a substance reducing fuel costs and/or inhibiting knocking introduced to the engine, e. g. the amount of water and/or the proportions of low and higher octane fuel, can be automatically controlled by the pressure of the exhaust gas. My observations show that there appears to be a direct relationship between the pressure of the exhaust gas and the H. P. output of the engine. With a higher H. P. output of the engine, the pressure of the exhaust gas increases, and accordingly the proportion of water and/or low-octane fuel introduced is increased and of higher octane fuel, e. g. gasoline, is decreased.

In accordance with the present invention, use is made of the phenomenon that the exhaust pressure of the engine bears a sufficiently fixed relationship to its H. P. output for practical purposes, automatically to introduce low-octane fuel at a time when the conditions in the cylinder are such that, if required with water addition, satisfactory and generally complete combustion of the low-octane fuel is assured. Without limiting the invention by any theory, these conditions appear to be set up when the degree of compression and therefore temperature set up by a sufficiently large charge of fuel and air mixture are such that the low-octane fuel is sufficiently vaporised for satisfactory combustion.

As a low-octane fuel, inter alia, kerosene (water white) may be employed. Its initial boiling point may be around 195° Fahrenheit. When injecting low-octane fuel, injection of water, preferably automatically, is usually required to prevent knocking.

Preferred embodiments of the invention and how it may be carried out in practice will be further illustrated, by way of example, with reference to the accompanying drawings, but it should be understood that the invention is not limited to the examples given.

Figure 1:
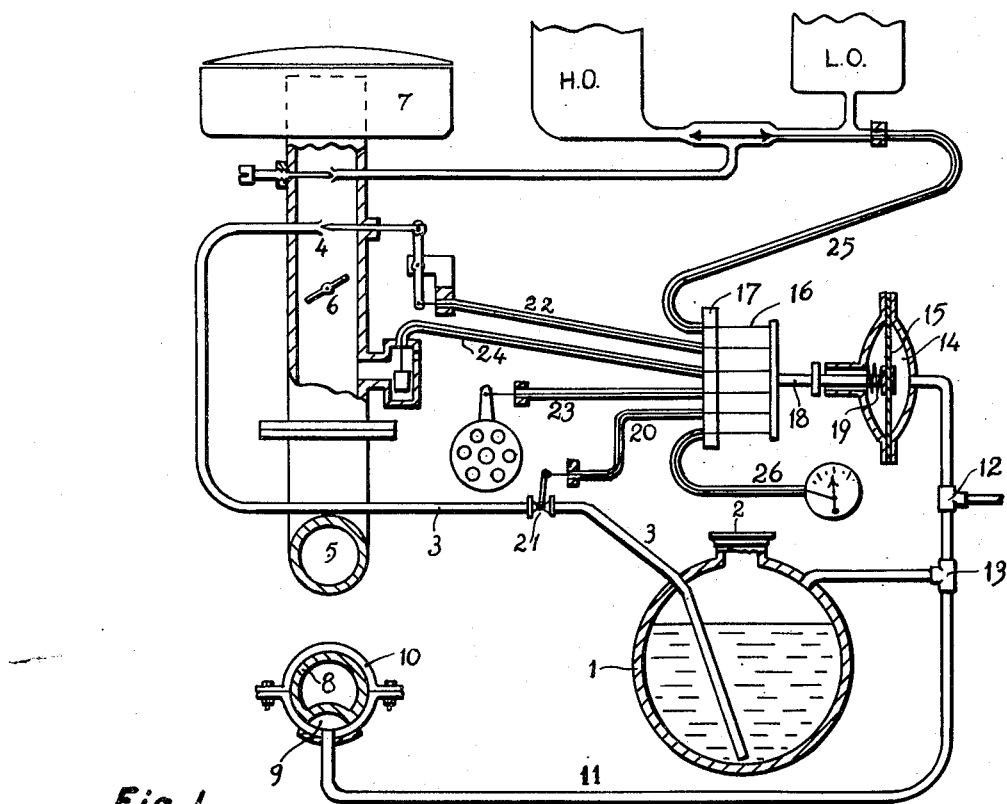
Fig. 1 illustrates diagrammatically a water injection system in accordance with the present invention.
Figure 2:
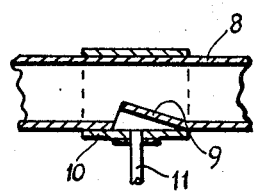
Fig. 2 illustrates diagrammatically in longitudinal section on the line II—II of Fig. 1 the clamp with its gas scoop pick-up for connecting the exhaust pipe with the water tank.

The water to be injected into the engine is contained in an air-tight water tank 1, say of 2 gallons capacity provided with a suitable sealing cap 2. 3 is a water pipe-line, which may pass through the wall of the said tank, preferably to a point at or near the bottom thereof, by means of which water is taken from the tank to a variable or fixed water jet 4 for introduction into the air flowing into the induction manifold 5 for introduction to the cylinders of the engine. The said pipe-line may be about a quarter of an inch in diameter whereas a water jet of 0 to .056″ diameter may be employed with advantage. The maximum static head to be overcome usually amounts to about 6″ of water. The water may be introduced in front of the choke 6 which usually takes the form of a butterfly valve or even through the top of the air filter 7. At a suitable point in the exhaust pipe 8 a gas scoop pick-up 9 which covers about $\frac{1}{10}$ of the cross-sectional area of the exhaust pipe is provided in a clamp 10, by means of which some of the exhaust gas is introduced through an exhaust gas pipeline 11 to the aforesaid water tank above the level of the water therein, thus setting up a pressure head of exhaust gas for injecting water into the fuel-air mixture.

To the exhaust gas pipe-line, which may be about a quarter of an inch in diameter, a pressure gauge should preferably be connected at 12, which usually has a scale reading between 0 and 150 mm. of mercury. I prefer to use a mercury sphygmomanometer.

The system illustrated is admirably adapted to the operation of additional automatic controls and indicators. Thus the exhaust gas pipe-line 11 may be connected by the T-piece 13 with one side 14 of a spring loaded diaphragm 15 which is connected by Bowden type cables 16 and a cable sheath anchor block 17 to one or more automatic controls as hereinafter indicated. The controls are actuated by the movements of a push-pull rod 18 operating the said cables, which is itself actuated by the said diaphragm 15. The said diaphragm 15 may be 6″ in diameter, and the pressure of the helical spring 19 may be 12 pounds released and 27 pounds compressed.

As the first of the said controls actuated via the cable 20 by the movements of the push-pull rod 18 may be mentioned an automatic valve control 21, provided in the water pipe-line 3, additionally controlling the flow of water therein.

By another Bowden type cable 22 actuated by the said push-pull rod 18 connected to the diaphragm 15, the diameter of the water jet may be additionally controlled at 4.

Again, the diaphragm 15 may operate an ignition advance or retard control by means of a cable 23 connected therewith.

An extra air inlet may be provided connected to the manifold, through which in certain circumstances extra air may be introduced besides that coming through the carburettor, said admission also being automatically controlled from the diaphragm via the Bowden type cable 24. Extra air may be desired to counteract an unnecessarily large power fuel jet in the carburettor, i. e. unnecessarily large at higher altitudes. If desired, two fuel tanks H. O. and L. O. may be provided, one for high-octane fuel and the other for low-octane fuel, each line for the introduction of fuel from said tank being provided with separate controls actuated by the said diaphragm 15, via the Bowden type cable 25, so that each fuel supply is automatically regulated as required. As low-octane fuel I may use kerosene (water white).

An indicator showing whether high-octane fuel alone or the mixture of high and low octane fuel and water or low-octane fuel and water are being injected controlled by the Bowden type cable 26 is also provided.

With a device as hereinbefore described fitted to a 1947 Plymouth (6 cylinder) car, a decrease of approximately 25% in gasoline consumption was attained, although the rated output of the engine for normal gasoline was maintained.

Figure 3:
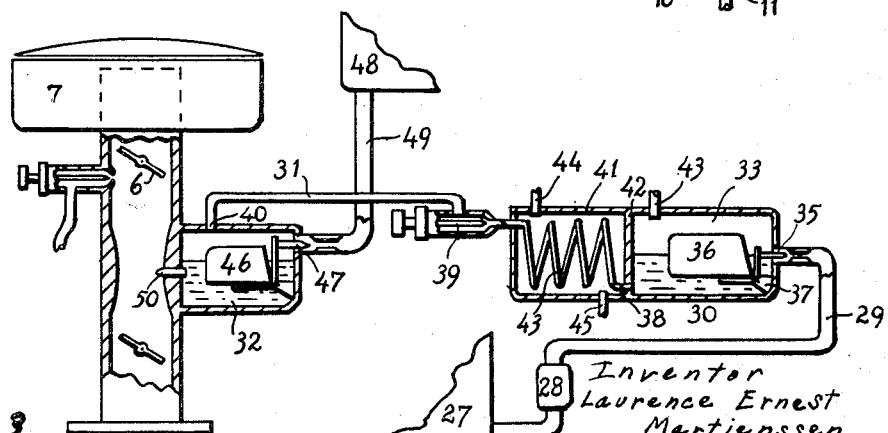
Fig. 3 illustrates diagrammatically a system for the injection of low-octane fuel in accordance with the invention.

Referring to Fig. 3, kerosene (water white) is filled into the main fuel tank 27 of a car. To operate the engine, this fuel is pumped by a normal fuel 28 through tube 29 to an automatic control device 30 connected by tube 31 to the carburettor 32. The essential part of this control device 30 consists of a small gas-tight container 33 for kerosene to the top of which an exhaust gas line is connected by the attachment 34 for setting up a pressure head of exhaust gas therein. The flow of kerosene from the main tank to the said control device is regulated by a valve 35 operated by a float 36 in the said container 33. When the engine is running with an increased H. P. output, it is ready to operate with kerosene or increased amounts of paraffin, as the case may be. The said increase in output results in an increase in the pressure head of exhaust gas which forces kerosene from the said control device 30 to the carburettor 32. By this the level of kerosene in the control device is lowered and consequently the float sinks, opening the valve 35 in the kerosene supply line 29 to a corresponding extent and thus admitting the requisite amount of kerosene from the main tank.

The gas-tight container 33 of the said control device is preferably constructed as a closed metal cylinder 33 of suitable size, say 1¼″ in internal diameter and about 2″ long. It may, however, also be made of glass to allow direct observation of its functions. The inlet valve 35 for kerosene, which may be about ¼″ in diameter and is situated at about the middle of one end of the said cylinder, is closable by a needle operated by a float within said cylinder, which is hinged to a point 37 on the inside of the end wall below the said valve. An inlet attachment 34 leading to the exhaust gas line is situated at the top of the said cylinder. The connecting point 38 for the line 31 taking kerosene to the carburettor 32 is situated near the bottom of the cylinder. In the said line an adjustable valve 39 is situated, for example, of the needle type, which can be set according to the general proportions of kerosene required. The point of admission 40 of kerosene to the carburettor 32 should be above the surface level of kerosene in the container of the control device, the difference in height of the two points being set to introduce the kerosene at a time when the engine is developing the minimum H. P. which will adequately use the low-octane fuel. On the 1947 Plymouth car employed, the optimum setting of difference of levels is about 2″, roughly equivalent to the manometer reading of 5 millimetres. In other words, kerosene starts flowing into the carburettor when the exhaust pressure is 5 millimetres. On another car, with an engine in poor condition, the optimum difference of levels was about 4½″, corresponding to an exhaust pressure of 12 to 15 millimeter mercury pressure.

In view of the rather high boiling range of the kerosene to be admitted to the carburettor, it may be desirable in cold climates to preheat it, for example, by heat exchange with hot water, say of 160° Fahrenheit. The water may be circulated from the cylinder head and pumped back to the radiator. The said preheating of the kerosene is advantageously carried out in a closed metal cylindrical heat exchanger 41, similar in form to the cylinder employed for the control device and advantageously in one piece therewith attached to its fuel exit end 42. A metal coil 43 is contained in the said heat exchanger and connected at one end with the point 38, where kerosene leaves the container 33 of the control device 30 and at its other with the line 31 leading to the carburettor 32 and preferably in front of the needle valve 39 in the said line 31. The points of admission 44 of hot water from the cylinder head and withdrawal 45 of water to the water pump and radiator are situated at opposite ends of the said cylinder.

The kerosene line 31 is connected at 40 with the top of the float chamber of the carburettor 32, in which a float 46 mounted and, functioning similarly as described in connection with the aforesaid control device, operates a needle valve 47 controlling the admission or cutting off of gasoline or other higher octane fuel supply in accordance with the engine requirements.

I have found it advantageous to reduce the size of the float chambers of the carburettor as against the sizes at present employed for gasoline engines to render them more sensitive as a means for adjusting the proportions of low and high octane fuel in accordance with the engine requirements. When using existing float chambers, their size may be reduced as desired, by the insertion of a lead or plastic casting. The pressure in the said float chamber 32 is substantially atmospheric. The gasoline or other higher grade fuel is contained in an auxiliary tank 48 say of 3 gallons capacity for a 25 H. P. car, and may be supplied by way of the pipe 49 past valve 47 to the carburettor by gravity, if necessary assisted by exhaust pressure. When the engine is running with a high H. P. output, i. e. under conditions under which a higher amount of kerosene is forced to the carburettor, this will naturally raise the level of fuel therein accordingly and cause the float to throttle the needle valve 47 in the gasoline line 49 and thus reduce the gasoline supply correspondingly.

The point of fuel injection 50 from the carburettor, the carburettor setting and ignition may be as for normal operations with gasoline.

Water is introduced into the air supply in front of the choke 6 with the aid of a pressure head of exhaust gas as hereinbefore described. The adjustment of the proportions of the various fuel constituents is entirely automatic depending on the varied requirements of the engine, and corrective adjustments can be made by hand when necessary.

The mixture passing into the induction manifold 5 is in all respects suitable for the operation of the engine.

According to another method of carrying out my said invention, the kerosene is contained in a gas-tight auxiliary tank under a pressure head of exhaust gas, whereas gasoline is contained in the main gasoline tank and introduced into the float chamber of the carburettor in the normal way. Also in this case the level of kerosene in the auxiliary tank must be below the point of introduction of the kerosene into the float chamber of the carburettor. When the low-octane fuel has a substantially higher boiling range than gasoline, it will also be of advantage to preheat it prior to its introduction to the carburettor, for example, by heat exchange with water of about 160° Fahrenheit from the cylinder head, substantially as hereinbefore described. The device for the said preheating in the low-octane feed line should be situated as close as possible to the carburettor. The low-octane feed line is fitted close to the bottom of the auxiliary tank or passes to the bottom thereof and is advantageously provided with a filter. Advantageously a fixed or variable orifice control valve, for example, of the needle type, is contained in the low-octane feed line.

The size and type of orifice in the low-octane feed line is determined by the maximum fuel requirement of the engine at maximum H. P. output.

The maximum exhaust pressure which is a factor of the scoop size in the exhaust pipe can be made such that it will overcome the fuel pump pressure (supplying kerosene) thereby causing high-octane fuel to flow again at maximum H. P. output, if desired.

I use a variable jet in the low-octane feed line in conjunction with a manometer reading the pressure in a restricted gasoline supply under normal conditions on high roads to determine this size.

It appears that a fixed jet in the low-octane fuel line may supply the correct amount of fuel over the whole range but should it be found necessary to increase or decrease the quantity at any part of the range this may be effected by means of a spring loaded diaphragm actutaed by exhaust pressure, which operates a variable jet in the low-octane fuel line, the diaphragm being made operable at any section of its range (which may be 0–120 millimetres of mercury) by adjustment of the spring and stops therein.

According to one example of my invention, if the low-octane fuel flow is started at say 5 millimetres of mercury exhaust pressure, the ratio of low-octane to high-octane fuel, which at this pressure is 0:100, becomes, by the time the exhaust pressure is say 15 millimetres of mercury, nearly 100:0. Immediately the exhaust pressure falls below the said 15 millimetres of mercury, the mixture of fuels again takes place and by the time the exhaust pressure has fallen below 5 millimetres, pure gasoline is being fed into the carburettor.

In operating a passenger car under normal road conditions in accordance with the invention, I have found, for example, that in town running the ratio of kerosene:gasoline is about 1:1 with the Plymouth car for touring, and long distance running about 10:1, and the amount of water added is often about a quarter that of the kerosene. The parts are by volume.

Whereas in the Union of South Africa the fuel costs with normal gasoline operation in the said car are at present prices of the order of 1.5d per mile, the fuel costs when operating the same car in accordance with the present invention are only of the order of .85d per mile.

The behaviour of a 1947 Plymouth car modified in accordance with the invention is in all respects as good as in normal gasoline operation and no deleterious effects, such as loss of power, thinning of oil or incomplete combustion, are observed. The mixture employed in this case was gasoline:kerosene:water=1:10:2½ approximately for long runs.

The invention is suitable, inter alia, both for the operation of passenger cars and heavy vehicles, such as motor trucks or omnibuses and farm tractors. It may be applied in the construction of new cars and in the conversion for fuel economy of existing gasoline vehicles.

I claim:

1. An improved method of operating an internal combustion engine, which comprises injecting, in amounts regenerated with the aid of a pressure head of exhaust gas from the engine, low-octane fuel from an air-tight container for said fuel into the carburettor which is connected with a source of fuel of better octane number, the supply of which is shut off in like manner as the low octane fuel is supplied.

2. An improved method of operating an internal combustion engine, according to claim 1, in which kerosene (water white) is the low-octane fuel.

3. An improved method of operating an internal combustion engine, according to claim 2, in which the kerosene has an initial boiling point of about 195° Fahrenheit.

4. An improved method of operating an internal combustion engine, which comprises separately introducing to the engine a substance reducing fuel costs and a substance inhibiting knocking, with the aid of a pressure head of exhaust gas and controlling the proportions of these substances and the normal fuel by the pressure of the exhaust gas in direct contact with separate bodies of the said substances in the liquid state.

5. A device for use with an internal combustion engine for the purpose of introducing to the engine a substance reducing fuel costs and inhibiting knocking, with the aid of a pressure head of exhaust gas, comprising an airtight water tank; a water pipe-line leading from said tank from a point near the bottom thereof to a water jet adapted to introduce water into the air flowing into the induction manifold at a point in advance of the carburettor choke; a gas pipe-line leading from the exhaust pipe to the said water tank, for the purpose of introducing exhaust gas to said tank above the level of the water therein and producing a pressure head of exhaust gas for injecting water into the fuel-air mixture in the carburettor; and a springloaded pressure operated diaphragm connected to said exhaust gas pipe-line and adapted to operate one or more automatic controls through Bowden-type cables, in accordance with variations in the exhaust pressure.

6. A device for use with an internal combustion engine, according to claim 5, in which the diaphragm operates a valve provided in the water pipe-line for controlling the flow of water therein.

7. A device for use with an internal combustion engine for the purpose of introducing to the engine a substance reducing fuel costs and inhibiting knocking, with the aid of a pressure head of exhaust gas, according to claim 5, in which the diaphragm controls the diameter of the water jet.

8. A device for use with an internal combustion engine for the purpose of introducing to the engine a substance reducing fuel costs and inhibiting knocking, with the aid of a pressure head of exhaust gas, which comprises a diaphragm actuated by variations in the pressure of the exhaust gas of the engine and adapted to operate an ignition advance or retard control.

9. A device for use with an internal combustion engine for the purpose of introducing to the engine a substance reducing fuel costs and inhibiting knocking, with the aid of a pressure head of exhaust gas, which comprises a diaphragm actuated by variations in the pressure of the exhaust gas of the engine and adapted to operate a control for the admission of air to the induction manifold through an additional air inlet in said manifold.

10. A device for use with an internal combustion engine for the purpose of introducing to the engine a substance reducing fuel costs and inhibiting knocking, with the aid of a pressure head of exhaust gas, which comprises a diaphragm actuated by variations in the pressure of the exhaust gas of the engine adapted to operate control valves in the pipe-line leading from two fuel tanks, one for low-octane fuel and the other for high-octane fuel, so as to regulate the fuel supply in accordance with the variations in the exhaust pressure.

11. A device for use with an internal combustion engine for the purpose of introducing to the engine a substance reducing fuel costs and inhibiting knocking, with the aid of a pressure head of exhaust gas, comprising a tank for low-octane fuel; an automatic control device comprising a small gas-tight container for receiving low-octane fuel from said fuel tank through a pipe-line, an exhaust gas pipe-line leading from a gas take off in the exhaust pipe to the top of said gas-tight container for the purpose of setting up a pressure head of exhaust gas in said container and a float valve in said container for regulating the flow of low-octane fuel from said fuel tank to said container; a pipe-line for conveying low-octane fuel from said gas-tight container to the carburettor; an adjustable valve in said pipe-line; and a tank for high-octane fuel connected by a pipe-line to the carburettor.

12. A device for use with an internal combustion engine, according to claim 11, in which the pipe-line leading from said gas-tight container to the carburettor enters the carburettor at a point higher than the level of the low-octane fuel in the container.

13. A device for use with an internal combustion engine, according to claim 11, having means for heating the low-octane fuel before it enters the carburettor, comprising a heat exchanger in the pipe-line leading from the gas-tight container to the carburettor, in which heat exchange takes place with water circulating from the cylinder head to the radiator.

14. An improved method of operating an internal combustion engine, which comprises introducing into the air supply to the engine both water and kerosene in amounts automatically controlled to give optimum performance by variations in pressure of exhaust gas in direct contact with separate liquid bodies of water and kerosense.

15. An improved method of operating an internal combustion engine of the gasoline type, which comprises introducing gasoline, kerosene and water in proportions varying with the performance of the engine and automatically controlled by variations in the pressure of the exhaust gas, in direct contact with separate liquid bodies of water and kerosene, the supply of gasoline being decreased and shut off as the supply of kerosene is increased.

16. A device for use with an internal combustion engine for the purpose of introducing liquid fuel thereto in controlled amounts, which comprises a float chamber through the entry orifice of which liquid fuel is fed, which orifice is controlled by the float in said chamber and an exit orifice in said chamber connected with the carburettor for feeding liquid fuel thereto and a pipe connecting the upper part of the float chamber with the exhaust gas manifold.

17. A device for use with an internal combustion engine for feeding a liquid fuel of higher octane value and a liquid fuel of lower octane value to the engine in proportions varying with the performance of the engine, which comprises a float chamber through the entry orifice of which a liquid fuel of lower octane value is fed, which orifice is controlled by the float in said chamber and an exit orifice in said chamber connected with a second float chamber for feeding the said liquid fuel of lower octane value thereto, and a pipe connecting the upper part of the first float chamber with the exhaust gas manifold; a float in the said second float chamber controlling the entry orifice thereto through which a fuel of higher octane value is fed and means for passing liquid fuel from the said second float chamber to the carburettor.

LAURENCE ERNEST MARTIENSSEN.

References Cited in the file of this patent

UNITED STATES PATENTS

| Number | Name | Date |
| --- | --- | --- |
| 1,530,464 | Leedom | Mar. 17, 1925 |
| 1,803,097 | Critchlow | Apr. 28, 1931 |
| 2,073,887 | Strancke | Mar. 16, 1937 |
| 2,141,029 | Bohli | Dec. 20, 1938 |
| 2,430,852 | Allen | Nov. 18, 1947 |
| 2,445,479 | Francis | July 20, 1948 |
| 2,470,366 | Ostling | May 17, 1949 |